United States Patent Office 3,746,649
Patented July 17, 1973

3,746,649
STABLE LIQUID ENZYME PRODUCT
John H. Barrett, Jr., 1204 Pine St.,
Norwalk, Calif. 90650
No Drawing. Filed Oct. 1, 1971, Ser. No. 185,894
Int. Cl. C11d 7/42
U.S. Cl. 252—170
17 Claims

ABSTRACT OF THE DISCLOSURE

Liquid enzyme product stable against proteolytic degradation and consisting essentially of an enzyme of the amylose or protease type and 100 to 500 parts, per part of the enzyme, of an organic liquid medium free of glycerine and not a solvent for the enzyme and selected from certain alcohols, alkylene glycols, alkylene glycol alkyl or phenyl ethers, alkylene glycol esters, alkoxy ethanols and propanols and alkoxy triglycols, and an enzyme ingredient comprising alkaline or neutral protease or amylase; the product can be packaged in an aerosol container for user convenience.

BACKGROUND OF THE INVENTION

This invention has to do with stable liquid enzyme products and more particularly to such liquid products useful for prespotting of clothes, prior to regular washing thereof or other cleansing uses. As such, the invention is concerned with provision of a liquid enzyme stable in storage which is effective in use, low in cost and liquid for easy application, e.g. by spray or aerosol delivery.

Prior art

Enzymes are known to be effective in removal of protein-based stains. Enzyme products for such purposes have been marketed, in powder form typically. Such products have heretofore been necessarily dry until prepared for immediate use because the proteolytic enzymes tend to be self-destructive in aqueous environments. See U.S. Pat. 3,472,783 to Smillie et al.; U.S. Pat. 3,451,935 to Roald et al.; and U.S. Pat. 3,519,379 to Blomeyer et al.

SUMMARY OF THE INVENTION

Accordingly, it is a major objective of the present invention to provide a storage stable liquid enzyme product including a liquid medium providing a suitable environment for enzymes and amenable to convenience packaging, e.g. in aerosol containers.

This and other objectives of the invention are realized in a liquid enzyme product according to the invention and consisting essentially of alkaline or neutral protease or amylase and mixtures thereof, e.g. derived from *Bacillus subtilis* and from 100 to 500 parts by weight per part of the enzyme of an anhydrous organic liquid medium free of glycerine and not a solvent for the enzyme; the organic liquid is selected from the group consisting of: alcohols having from 1 to 13 carbon atoms, alkylene glycols having molecular weights up to 600 except ethylene glycol, diethylene glycol, triethylene glycol, propylene glycol and dipropylene glycol; alkylene glycol alkyl ethers or phenyl glycol ethers having molecular weights up to 207; alkylene glycol alkyl esters having molecular weights up to 205; alkoxy ethanols and alkoxy propanols having molecular weights up to 201; ketones having molecular weights up to 185 and alkoxy triglycols having molecular weights up to 207.

The enzyme in the medium may be derived from *Bacillus subtilis*, may have an average particle size between 1 and 100 microns or higher or lower. The liquid product may further include from 0.25 to 10% by weight, based on the weight of the organic liquid, of a polyethylene glycol having a molecular weight between 1000 and 20,000 as a thickening agent. The liquid enzyme product may be packaged in an aerosol can together with a suitable quantity of a propellant for dispensing the product, the propellant comprising a normally gaseous, but liquefiable material partially soluble in the mixture in a sufficient amount, e.g. between about 1% and 50% by weight of the organic liquid.

DESCRIPTION OF THE PREFERRED EMBODIMENTS

As indicated, the present invention is concerned with liquid enzyme products having stability in storage. This storage stability is such as to enable the practical marketing of a liquid enzyme, a form of product highly preferred by household users, because of ease of application, less dusting and skin irritation and greater economy in use. Remarkable stabilities have been achieved with the present products. The anhydrous liquid medium may be selected from:

(1) Alcohols having 1 to 13 carbon atoms, e.g. alcohols selected from methanol, ethanol, propanols, butanols, pentanols, hexanols, heptanols, iso-octanols, isodecanols, trimethyl-4-nonanol and tridecanol;

(2) Alkylene glycols having molecular weights up to 600, other than ethylene glycol, diethylene glycol, triethylene glycol, propylene glycol, dipropylene glycol; which may be selected from hexylene glycol, polyethylene glycols having molecular weight between 190 and 600, 2-methyl-2-ethyl-1,3 propanediol, 2-ethyl-1, 3-hexanediol, and tetraethylene glycol;

(3) Alkylene glycol alkyl or phenyl ethers, e.g. having molecular weights up to 207 in which the alkyl group or phenyl group contains up to 6 carbon atoms. Among others these ethers may be mentioned: diethylene glycol diethyl ether, diethylene glycol monomethyl ether, diethylene glycol dibutyl ether, diethylene glycol monobutyl ether, propylene glycol monomethyl ether, and dipropylene glycol monomethyl ether;

(4) Ethylene glycol alkyl esters having molecular weights up to 205, in which the ester group contains from 2 to 4 carbon atoms inclusive, e.g. diethylene glycol monomethyl ether acetate, and diethylene glycol monobutyl ether acetate;

(5) Alkoxy ethanol or propanols having a molecular weight up to 201 and in which the alkoxy group contains up to 4 carbon atoms, e.g. 2-ethoxyethanol, methyl-2-ethoxyethanol, isobutyl-2-ethoxyethanol, butyl-2-ethoxyethanol, hexyl-2-ethoxyethanol, phenyl-2-ethoxyethanol, 1-butoxyethoxy-2-propanol, n-butoxy-2-propanol and n-propoxy-2-propanol;

(6) Ketones having a molecular weight up to 185 e.g. selected from the group consisting of acetone, methylethyl ketone, methylisobutyl ketone, cyclohexanone, methyl-n-amyl ketone, methylisoamyl ketone, ethylbutyl ketone, diisobutyl ketone, isobutylheptyl ketone, mesityl oxide, isophorone, acetyl acetone and diacetone alcohol; and (7) Alkoxy triglycols having a molecular weight up to 207 and in which the alkoxy group contains up to 4 carbon atoms inclusive, e.g. selected from methoxytriglycol, ethoxytriglycol and butoxytriglycol.

The above mixture may also include a thickening agent, e.g. from 0.25 to 10% by weight of a polyethylene glycol having a molecular weight between 1,000 and 20,000. Suitable enzymes for the present liquid enzyme products are described in detail in U.S. Pat. 3,451,935 which description is hereby incorporated by reference to avoid unduly lengthening this specification. Particularly preferred are neutral or alkaline protease and amylase enzymes, suitably having an average particle size of from 1 to 100 microns. The amount of enzyme employed is widely variable with liquid products containing between 100 to 500 and higher to 5000 parts by weight of the organic medium per part of enzyme. Solvents for enzyme ingredients should be excluded from the formulations, thus, water, glycerine, ethylene glycol, diethylene glycol, triethylene glycol, propylene glycol and dipropylene glycol liquids are not to be present in the invention compositions. While pH of the enzyme prespotter is not narrowly critical, it is desirably on the near-to-neutral to alkaline side, i.e. between 6 and 10.

The just described compositions are liquid and highly adapted to spray application onto premoistened spots on fabric. Local application thusly means economy in use. Alternatively, the prespotter may be poured onto spotted areas or added to water for soaking or incorporated in wash water in a conventional washing machine.

Maximum benefit is realized through spray application, e.g. by pumping through a nozzle or preferably by aerosol spray application.

In a highly preferred embodiment, there is provided an aerosol package comprising a pressure resistant can having a dispensing nozzle and containing the organic liquid-enzyme mixtures mentioned, as well as a conventional aerosol propellant, e.g. nitrogen, carbon dioxide, nitrous oxide, an inert hydrocarbon having up to five carbon atoms or halogenated hydrocarbon having up to four carbon atoms, which is normally gaseous, but liquefiable at container pressure below 75 pounds/sq. inch, and e.g. soluble in the mixtures mentioned in a sufficient amount, i.e. soluble enough to form 1% to 50% solutions in the organic liquid.

EXAMPLES

In the examples following all parts and percentages are by weight unless otherwise indicated.

Enzyme AP herein is a blend of neutral and alkaline protease and α-amylase sold by Monsanto Company.

EXAMPLE 1

One-half percent by weight based on the total weight of the composition, of Enzyme AP amylase enzyme was dispersed by stirring in hexylene glycol.

EXAMPLE 2

Example 1 was duplicated but substituting a polyethylene glycol having an approximate molecular weight of 400 as the liquid.

Control 1

Example 1 was duplicated but substituting water as the vehicle.

The products of Examples 1 and 2 and Control 1 were evaluated for strain removal activity by spraying the solution onto premoistened standard stain cotton cloths (blood, carbohydrate and ball point pen ink stained) and then washing with detergent in a standard washer, and evaluating using these products as made, after 3 days and after 7 days storage at room temperature. Results were as follows:

|  | Percent stain removal | | |
| --- | --- | --- | --- |
|  | Initial | 3 days | 7 days |
| Example: | | | |
| 1 | 26 | 27 | 28 |
| 2 | 26 | 26 | 27 |
| Control 1 | 26 | 0 | |

It will be noted that the Control 1 enzyme product while initially as effective as the products of the present invention, lost effectiveness after only three days whereas the example products retained their activity after 7 days essentially undiminished. Other tests have indicated enzyme activity is retained for periods of three months and longer at room temperature.

EXAMPLE 3

Example 1 was duplicated, but substituting a blend of alkaline protease and amylase sold by Rohm and Haas Company under the name Protease 57. Test results were equivalent.

EXAMPLE 4

Example 1 was duplicated but substituting a blend of alkaline protease and amylase sold by Wallenstein under the name Alkaline Protease 201–HA. Results were equivalent.

EXAMPLE 5

Example 1 was duplicated but substituting ethanol for hexylene glycol. Results were equivalent.

EXAMPLE 6

Example 1 was duplicated but substituting diethylene glycol monomethyl ether for the hexylene glycol. Results were equivalent.

EXAMPLE 7

Example 1 was duplicated but substituting diethylene glycol monomethyl ether acetate for the hexylene glycol Results were equivalent.

EXAMPLE 8

Example 1 was duplicated but substituting methyl-2-ethoxyethanol for hexylene glycol. Results were equivalent.

EXAMPLE 9

Example 1 was duplicated but substituting acetone for hexylene glycol. Results were equivalent.

EXAMPLE 10

Example 1 was duplicated but substituting methoxytriglycol for hexylene glycol. Results were equivalent.

EXAMPLE 11

An aerosol package is made up by packaging under pressure in a dispensing container: Enzyme AP, 0.25 part, hexylene glycol 26.35 parts. Polyethylene Glycol 6000, 0.5 part, Freon 12 (dichlorodifluoromethane), 20 parts, and perfume 0.25 part. The composition is effective as a prespotter sprayed directly onto areas of cloths previously stained with blood, spinach, starch, grease and ball point pen ink. The composition when tested again after 13 months of storage at 130° F. is again found effective.

I claim:

1. Liquid enzyme product stable against proteolytic degradation and consisting essentially of an enzyme selected from the group consisting of alkaline or neutral protease or amylase and mixtures thereof, and from 100 to 500 parts by weight per part of said enzyme of an anhydrous organic liquid medium free of glycerine and not a solvent for the enzyme, said organic liquid being selected from the group consisting of:

alcohols having from 1 to 13 carbon atoms, selected from the group consisting of methanol, ethanol, propanols, butanols, pentanols, hexanols, heptanols, iso-octanols, iso-decanols, trimethyl-4-nonanol, and tridecanol;

alkylene glycols selected from the group consisting of hexylene glycol, polyethylene glycols having molecular weights between about 190 and 600, 2-methyl-2-ethyl-1, 3 propanediol, 2-ethyl-1, 3-hexanediol, and tetraethylene glycol;

alkylene glycol alkyl ethers selected from the group consisting of diethylene glycol diether, diethylene glycol monomethyl ether, diethylene glycol dibutyl ether, diethylene glycol monobutyl ether, diethylene glycol monophenyl ether, propylene glycol monomethyl ether and dipropylene glycol monomethyl ether;

ethylene glycol alkyl esters selected from the group consisting of diethylene glycol monomethyl ether acetate and diethylene glycol monobutyl ether acetate;

alkoxy ethanols or propanols selected from the group consisting of 2-ethoxyethanol, methyl-2-ethoxyethanol, isobutyl-2-ethoxyethanol, butyl - 2 - ethoxyethanol, hexyl-2-ethoxyethanol, phenyl-2-ethoxyethanol, 1-butoxyethoxy-2-propanol, n-butoxy - 2 - propanol and n-propoxy-2-propanol;

ketones selected from the group consisting of acetone, methylethyl ketone, methylpropyl ketone, methylisobutyl ketone, cyclohexanone, methyl-n-amyl ketone, methylisoamyl ketone, ethyl butyl ketone, diisobutyl ketone, isobutyl-heptyl ketone, mesityl oxide, isophorone, acetyl acetone and diacetone alcohol; and alkoxy triglycols selected from the group consisting of methoxytriglycol, ethoxytriglycol and butoxytriglycol.

2. Liquid enzyme product according to claim 1 in which said enzyme is derived from *Bacillus subtilis*.

3. Liquid enzyme product according to claim 2 in which said organic liquid is an alcohol selected from the group consisting of methanol, ethanol, propanols, butanols, pentanols, hexanols, heptanols, iso-octanols, iso-decanols, trimethyl-4-nonanol, and tridecanol.

4. Liquid enzyme product according to claim 1 in which said organic liquid is an alkylene glycol selected from the group consisting of hexylene glycol, polyethylene glycols having molecular weights between about 190 and 600, 2-methyl-2-ethyl-1, 3 propanediol, 2-ethyl-1, 3-hexanediol, and tetraethylene glycol.

5. Liquid enzyme product according to claim 1 in which said organic liquid is an alkylene glycol alkyl ether selected from the group consisting of diethylene glycol diether, diethylene glycol monomethyl ether, diethylene glycol dibutyl ether, diethylene glycol monobutyl ether, diethylene glycol monophenyl ether, propylene glycol monomethyl ether and dipropylene glycol monomethyl ether.

6. Liquid enzyme product according to claim 1 in which said organic liquid is an ethylene glycol alkyl ester in which said ester group contains from 2 to 4 carbon atoms inclusive.

7. Liquid enzyme product according to claim 6 in which said ethylene glycol alkyl ester is selected from the group consisting of diethylene glycol monomethyl ether acetate and diethylene glycol monobutyl ether acetate.

8. Liquid enzyme product according to claim 1 in which said organic liquid is an alkoxy ethanol or propanol in which said alkoxy group contains up to 4 carbon atoms inclusive.

9. Liquid enzyme product according to claim 8 in which said alkoxy ethanol or propanol is selected from the group consisting of 2-ethoxyethanol, methyl-2-ethoxyethanol, isobutyl-2-ethoxyethanol, butyl-2-ethoxyethanol, hexyl-2-ethoxyethanol, phenyl-2-ethoxyethanol, 1-butoxyethoxy-2-propanol, n - butoxy-2-propanol and n-propoxy-2-propanol.

10. Liquid enzyme product according to claim 1 in which said organic liquid is a ketone selected from the group consisting of acetone, methylethyl ketone, methylpropyl ketone, methylisobutyl ketone, cyclohexanone, methyl-n-amyl ketone, methylisoamyl ketone, ethyl butyl ketone, diisobutyl ketone, isobutyl-heptyl ketone, mesityl oxide, isophorone, acetyl acetone and diacetone alcohol.

11. Liquid enzyme product according to claim 1 in which said organic liquid is an alkoxy triglycol selected from the group consisting of methoxytriglycol, ethoxytriglycol and butoxytriglycol.

12. Liquid enzyme product according to claim 1 in which said enzyme has an average particle size between 1 and 100 microns.

13. Liquid enzyme product according to claim 1 and including also from 0.25 to 10% by weight, based on the weight of the organic liquid, of a polyethylene glycol having a molecular weight between 100 and 20,000 as a thickening agent.

14. Aerosol package comprising a pressure resistant can having a dispensing nozzle and containing the liquid enzyme product defined in claim 1 and a propellant for dispensing the product, said propellant comprising a normally gaseous, but liquefiable material partially soluble in the organic liquid.

15. Aerosol package according to claim 1 in which the amount of dissolved propellant is equal to between 1 and 50% by weight of the organic liquid.

16. Liquid enzyme product according to claim 1 in which said enzyme has an average particle size between 1 and 100 microns.

17. Liquid enzyme product according to claim 1 and including also from 0.25 to 10% by weight, based on the weight of the organic liquid, of a polyethylene glycol having a molecular weight between 100 and 20,000 as a thickening agent.

References Cited

UNITED STATES PATENTS

| | | | |
|---|---|---|---|
| 3,627,688 | 12/1971 | McCarty et al. | 252—DIG 12 |
| 3,557,002 | 1/1971 | McCarty | 252—DIG 12 |
| 3,625,909 | 12/1971 | Berg et al. | 252—171 |
| 3,607,653 | 9/1971 | Ziffer et al. | 252—DIG 12 |

WILLIAM E. SCHULTZ, Primary Examiner

U.S. Cl. X.R.

195—63; 252—DIG. 12

UNITED STATES PATENT OFFICE
CERTIFICATE OF CORRECTION

Patent No. 3,746,649　　　　　　　　Dated July 17, 1973

Inventor(s) John H. Barrett, Jr.

It is certified that error appears in the above-identified patent and that said Letters Patent are hereby corrected as shown below:

Column 1, line 13; "amylose or protease type and 100 to 500 parts, per part" should read -- amylase or protease type and 100 to 500 parts, per part --

Column 6, line 21; "having a molecular weight between 100 and 20,000 as a" should read -- having a molecular weight between 1,000 and 20,000 as a --

Column 6, line 38; "ing a molecular weight between 100 and 20,000 as a thick-" should read -- ing a molecular weight between 1,000 and 20,000 as a thick- --

Signed and sealed this 12th day of February 1974.

(SEAL)
Attest:

EDWARD M. FLETCHER, JR.　　　　　C. MARSHALL DANN
Attesting Officer　　　　　　　　　Commissioner of Patents